INVENTORS
Edward L. Copony
William J Gerstenmaier
BY Connolly and Hutz
ATTORNEYS Feb. 18, 1969   E. L. COPONY ET AL   3,428,786
TICKET PRINTER
Filed May 7, 1964
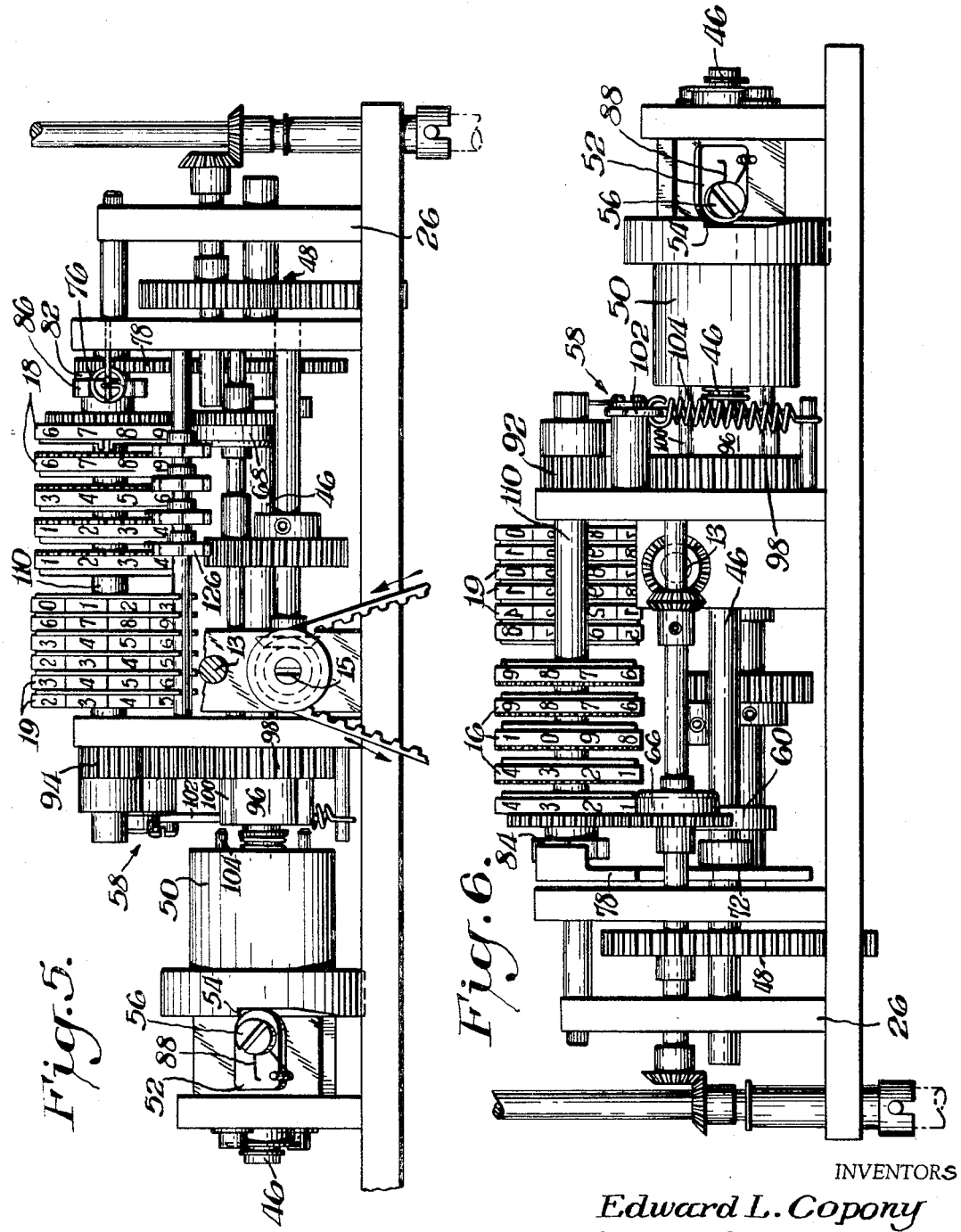
INVENTORS
*Edward L. Copony*
*William J. Gerstenmaier*
BY *Connolly and Hutz*
ATTORNEYS

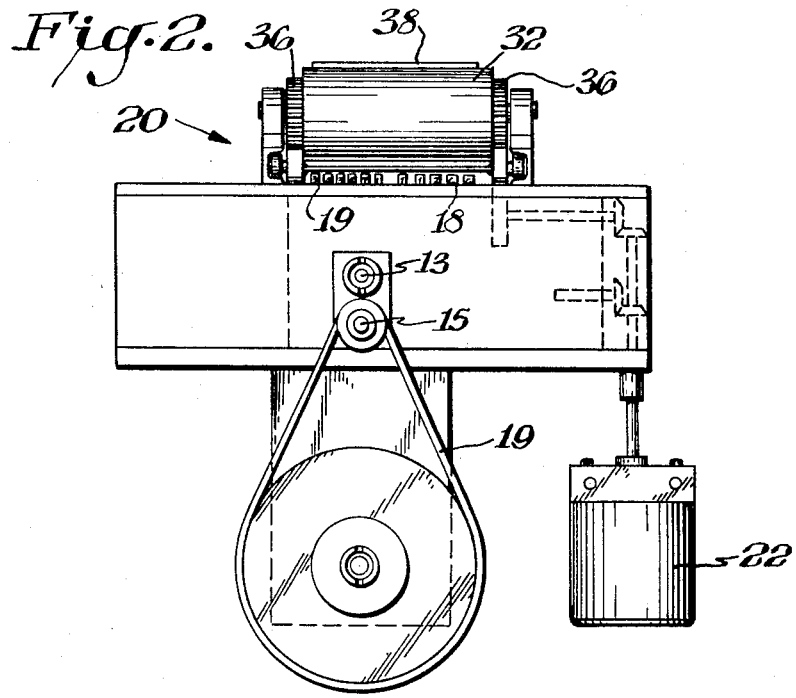
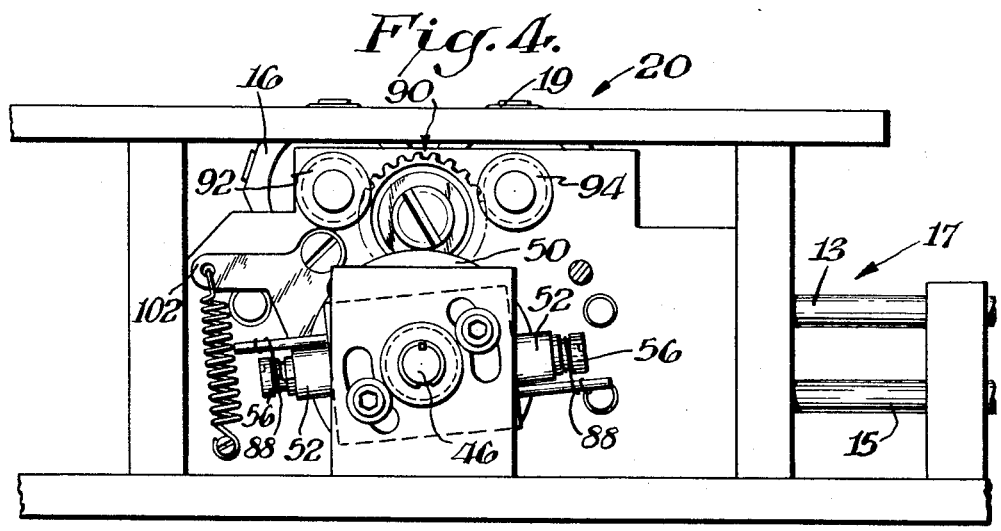

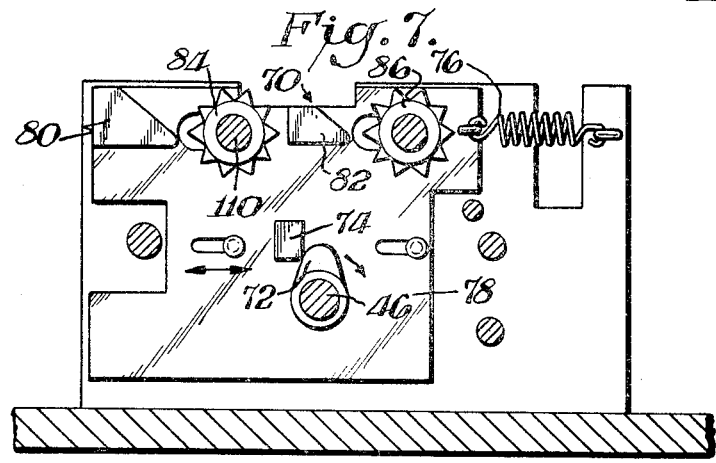
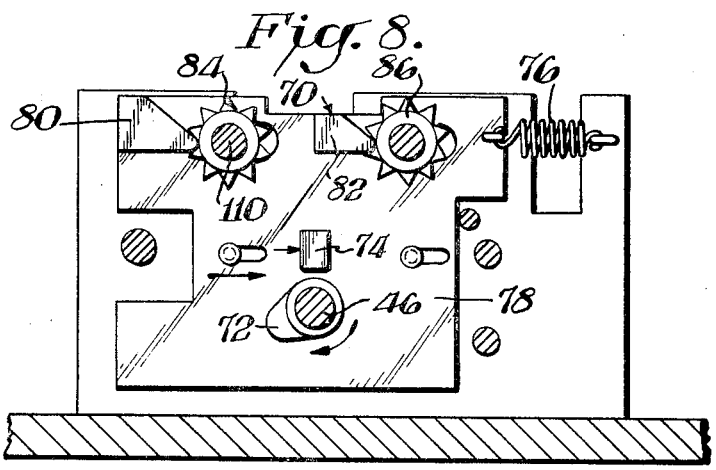
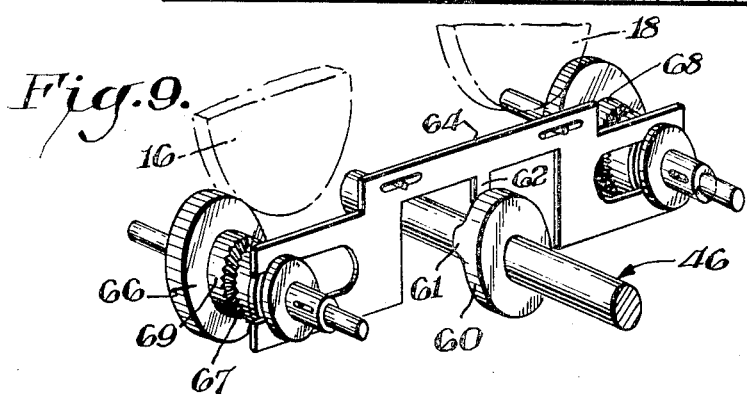

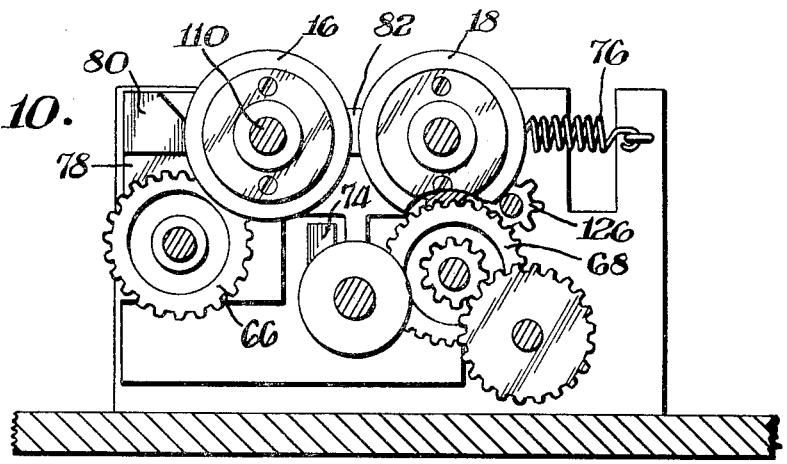
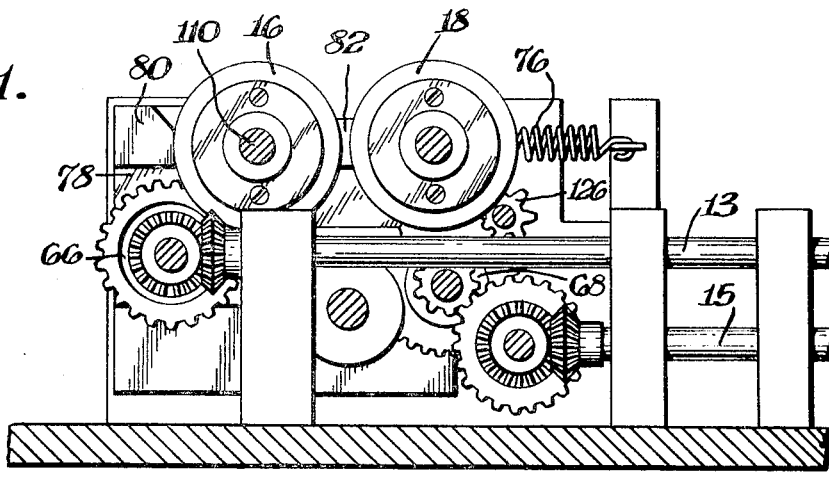
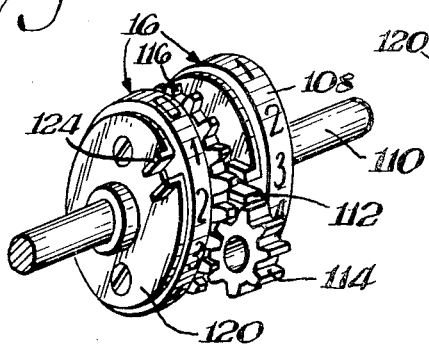
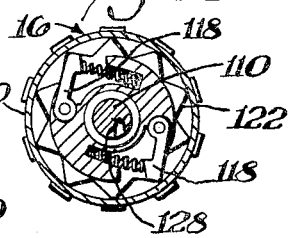
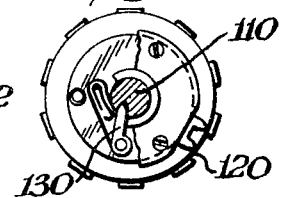
INVENTORS
Edward L. Copony
William J. Gerstenmaier
BY Connolly and Hutz
ATTORNEYS

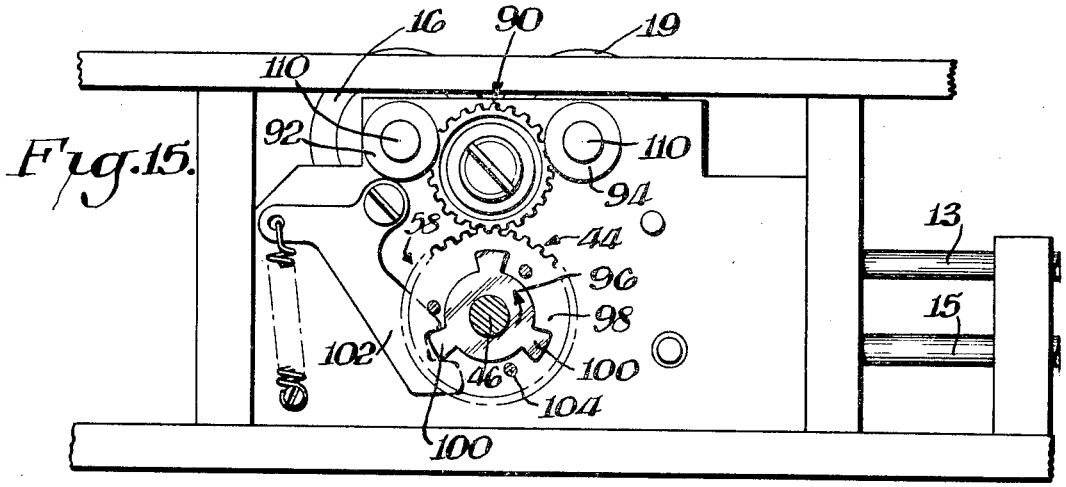
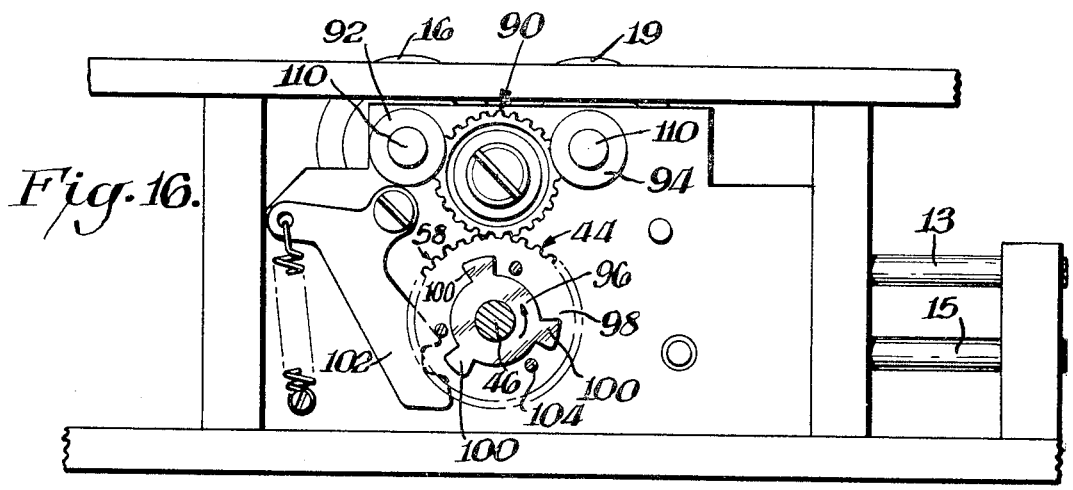
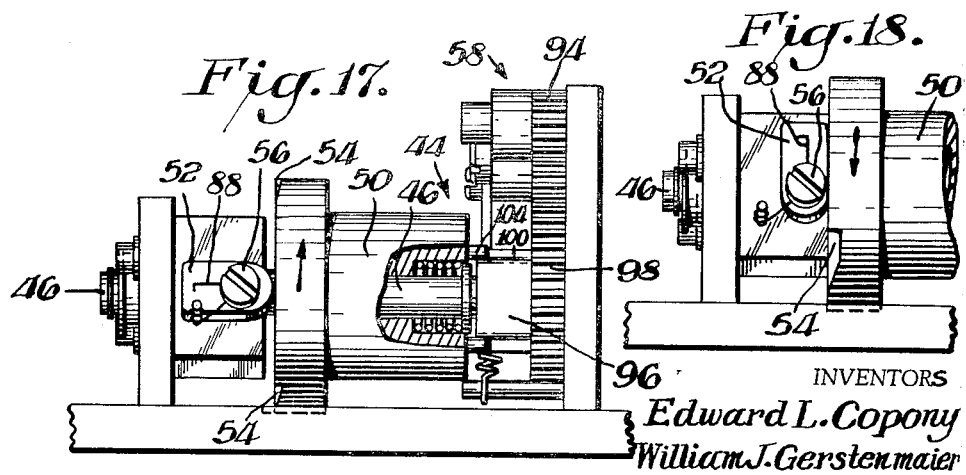
INVENTORS
Edward L. Copony
William J. Gerstenmaier
BY Connolly and Hutz
ATTORNEYS

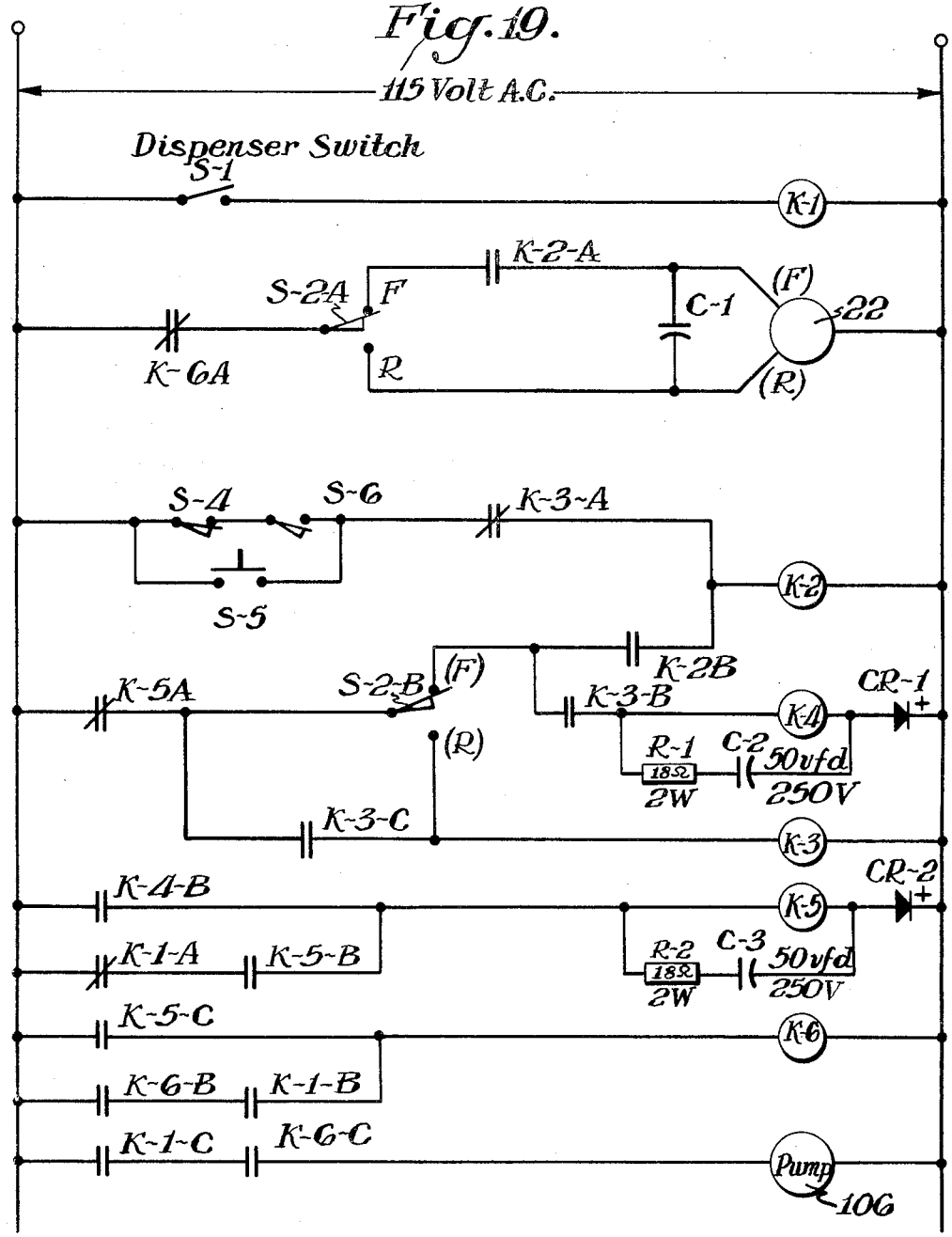

United States Patent Office 3,428,786
Patented Feb. 18, 1969

3,428,786
TICKET PRINTER
Edward L. Copony and William J. Gerstenmaier, Salisbury, Md., assignors to Symington Wayne Corporation, Salisbury, Md., a corporation of Maryland
Filed May 7, 1964, Ser. No. 365,828
U.S. Cl. 235—61.9                    12 Claims
Int. Cl. G06k 1/12, 3/00

ABSTRACT OF THE DISCLOSURE

A fluid dispenser having a computer for indicating the cost and quantity of dispensed fluid and a reset device for zeroizing its indicating elements before a subsequent dispensing operation incorporates a ticket printer having indicating elements connected to the computer indicated elements for operation thereby with printer reset means for the printer indicating elements. A reversible motor is connected to the printing mechanism and to the printer reset device for operating the printing mechanism in one direction of the motor and operating the printer reset device in its other direction.

---

This invention relates to a ticket printer for fluid dispensers and more particularly to such dispensers which are commonly used in automobile service stations.

With the growing trend for credit sales in such fields as gasoline dispensing, there is a great need for an effective way of supplying the customer with a credit receipt as well as obtaining an invoice for the service station auditing department. Such receipts are also useful for tax and other bookkeeping purposes. With many known dispensers the attendant must copy the sales information directly onto the invoice. In other dispensers the computer indicating wheels are connected to indicating wheels in a printing mechanism attached to the dispenser so that the price and gallons register in the printer as well as in the computer. The attendant then inserts a card in the printer and by the operation of a crank or a handle, he records the sales information from the printer. Such printers, however, are not only costly, to manufacture and difficult to operate but are also subject to frequent errors. For example, if the credit sale follows a cash sale and the attendant forgot to reset or zeroize the printer after the cash sale, the credit customer will be charged for both sales. Frequently, even after credit sales the attendant may forget to zeroize the indicating elements of some printers which could also result in a double charge to the next credit customer.

Accordingly, an object of this invention is to provide a ticket printer for a fluid dispenser which is simple in construction and automatic in operation.

A further object is to provide such a ticket printer which is free from human error in its accurate recording of a transaction.

In accordance with this invention, the printer indicating elements are connected to the computer indicating elements and are disposed adjacent the printing mechanism. A reversible motor operates the printing mechanism to print the information in its one direction and also operates the printer reset mechanism to zeroize the printer indicating elements in its other direction before a subsequent dispensing operation takes place. Since the same motor which prints the sales information also resets the indicating elements, there is no chance of the attendant forgetting to zeroize the indicating elements after a credit sale. Thus, once the attendant starts the motor to record the sales data, the indicating elements are then automatically reset without any additional operations or manipulations from the attendant. The reversible motor thereby does more than simply mechanize the printing and resetting operations; instead the reversible motor so interrelates these operations that the resetting of the printer indicating elements must necessarily take place whenever sales information is recorded. The reversible motor thereby provides a simple, economical and dependable arrangement with the multiple advantages of automatic resetting interlocked with the printing operation without the necessity of complicated controls or mechanisms.

Advantageously the motor may be part of an interlocking circuit with the computer reset mechanism to insure the starting of the printer motor, and thus the zeroizing of the printer indicating elements, every time the computer is reset. The intrelocking circuit thereby prevents any fluid from being dispensed until the printer indicating elements are reset regardless of whether the printer was used if the previous sale was for credit, or whether the printer was not used if the previous sales was for cash.

In an advantageous form of this invention the motor drives a timing shaft in both a print direction and in a reverse or reset direction. When the timing shaft rotates in the print direction it disengages the printer indicating elements from the computer indicating elements and actuates a full number mechanism to move the lowest order indicating elements of the printer to the nearest whole number and thus ready the indicating elements for the printing operation. When the timing shaft moves in the reset direction it actuates the printing reset mechanism to zeroize its indicating elements and re-engages them with the computer indicating elements to ready them for the next dispensing operation.

Novel features and advantages of the present invention will become apparent to one skilled in the art from a reading of the following description in conjunction with the accompanying drawings wherein similar reference characters refer to similar parts and in which:

FIG. 2 is a front view in elevation of the embodiment of the view shown in FIG. 1;

FIG. 4 is a side view in elevation of the embodiment of this invention shown in FIG. 3;

FIG. 5 is a front view in elevation of the embodiment of the invention shown in FIGS. 3–4;

FIG. 6 is a rear view in elevation of the embodiment of the invention shown in FIGS. 3–5;

FIG. 7 is a cross-sectional view through FIG. 3 along the line 7—7;

FIG. 8 is a cross-sectional view similar to FIG. 7 showing a different phase of operation;

FIG. 9 is a perspective view of a portion of the invention shown in FIGS. 1–8;

FIG. 10 is a cross-sectional view through FIG. 3 along the line 10—10;

FIG. 11 is a cross-sectional view taken through FIG. 3 along the line 11—11;

FIG. 12 is a perspective view of the portion of the invention shown in FIGS. 1–11;

FIG. 13 is a cross-sectional view in elevation of one of the indicating elements shown in FIG. 12;

FIG. 14 is a front view in elevation of one of the indicating elements shown in FIG. 12 with the cover plate partially broken away;

FIG. 15 is a cross-sectional view taken through FIG. 3 along the line 15—15;

FIG. 16 is similar to FIG. 15 showing a different phase of operation;

FIG. 17 is a front view in elevation of a portion of the invention shown in FIGS. 1–16;

FIG. 18 is a view similar to FIG. 17 showing a different phase of operation; and FIG. 19 is a schematic diagram of the electrical system of the embodiment of the invention described in FIGS. 1–18.

Figure 1:
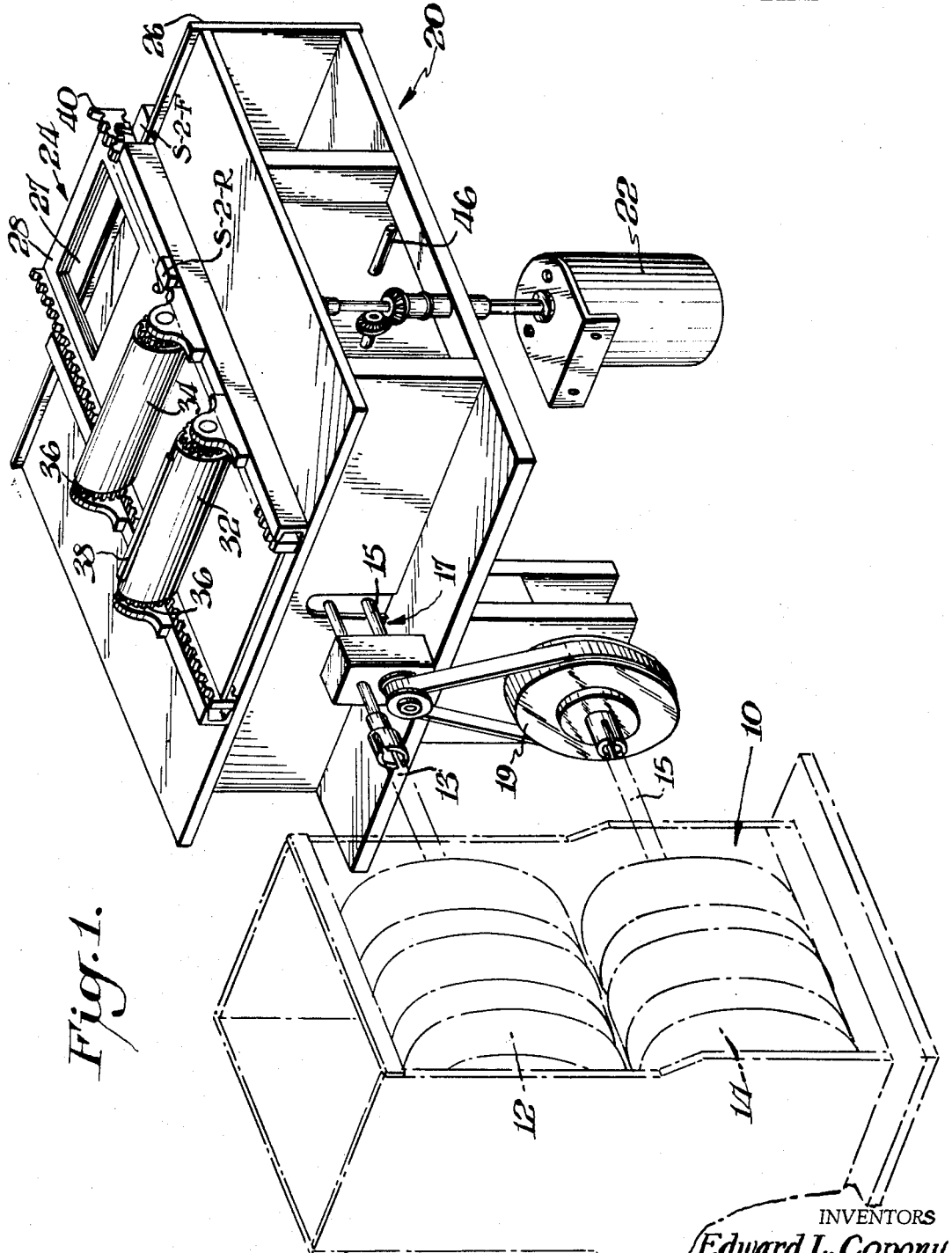
FIG. 1 is a perspective view of one embodiment of this invention.

In FIG. 1 is shown a conventional variator or computer 10 of a gasoline dispenser having a set of elements 12 for indicating the cost and a set of elements 14 for indicating the quantity of the dispensed gasoline. Indicating elements 12 and 14 are operably connected by a transmission arrangement 17 to corresponding sets of indicating elements 16 and 18 (shown in FIG. 3) of ticket printer 20, so that the figures shown on indicating elements 12 and 14 of the computer are also registered in the printer. A reversible motor 22 is connected to the ticket printer to operate a printing mechanism 24 in its one direction of movement and to reset indicating elements 16 and 18 in its other direction of movement as later described in detail. Motor 22 is actuated by either a manual switch S–5 (shown in FIG. 19) which may be placed in any convenient location on the printer housing 26 or by its connection with the computer reset switch S–4 (shown in FIG. 19) through an interlocking circuit later described in detail.

After a credit sale the service station attendant inserts the invoices and credit card above slot 27 in rack 28 of printing mechanism 24 and then actuates manual switch S–5 (shown in FIG. 19) to start motor 22. Printing mechanism 24 is of the type shown in Patent No. 1,660,068 in which rack or bed 28 is driven by motor 22 toward printing drums 32 and 34 which are disposed above cost and quantity indicating elements 16 and 18 and also above elements 19 (shown in FIG. 3) for indicating the date or other sales information. As rack 28 moves toward printing drums 32 and 34, it drives gears 36 to rotate the printing drums. The timing is such that the credit card invoices (not shown) are above indicating wheels 16, 18 and 19 when contact pads 38 on drums 32 and 34 are rotated downward to press against the credit card and invoices so that the sales information is recorded on the invoices. When the information is recorded reversing button 40 on rack 28 contacts reversing switch S–2–R to reverse the direction of motor 22. During this reverse direction motor 22 operates reset mechanism 44, shown in FIGS. 15–18 and later described in detail, to reset or zeroize the printer indicating elements for the next dispensing operation. When rack 28 returns to the position shown in FIG. 1 a second reversing switch S–2–F is contacted to change the direction and stop motor 22. This puts the motor in the print or forward direction and thus ready it for the next operation. The invoice and credit card are then removed from printer 24.

Figure 3:
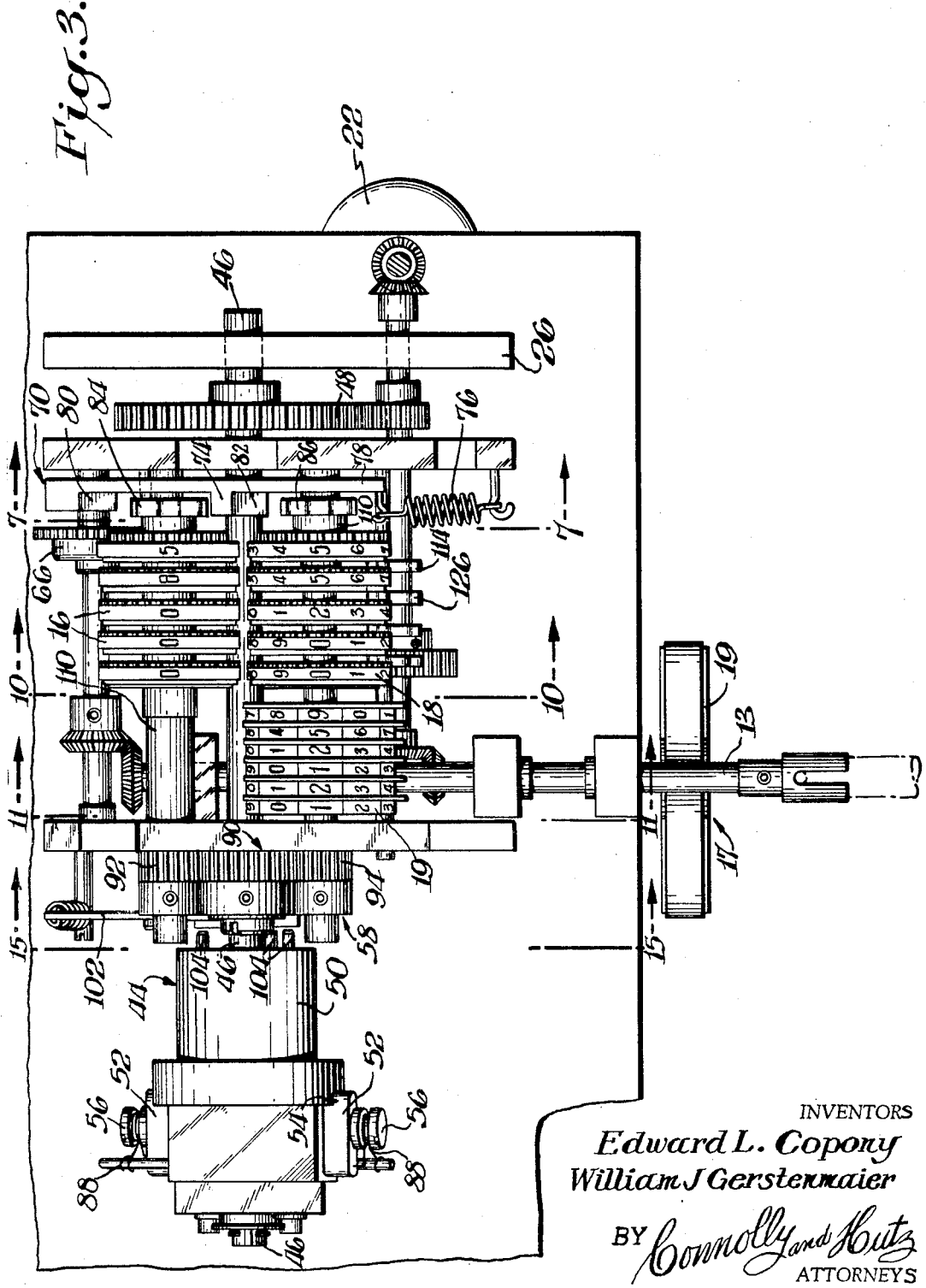
FIG. 3 is a plan view of the embodiment of the invention shown in FIGS. 1–2 with the printing mechanism removed.

As shown in FIGS. 1 and 3 computer indicating elements 12 and 14 are connected to printer indicating elements 16 and 18 through transmission 17. Transmission 17 includes computer cost and quantity shafts 13 and 15 which drive the lowest order printer indicating elements 16 and 18 through disengageable clutches 66 and 68 (shown in FIG. 9). A ten-to-one step-up 19 connects computer quantity indicating elements 14 to printer quantity indicating elements 18 so that the printer registers in, for example, hundredths of a gallon as compared to tenths of a gallon in the computer.

Referring now to FIGS. 10–14, the operation of the printer indicating elements is as follows. Computer shafts 13 and 15 drive clutches 66 and 68 respectively through a gear train to drive the lowest indicating elements of printer elements 16 and 18. FIGS. 12–14 show the lowest order 108 and next higher order 120 cost indicating elements; and quantity indicating elements 18 are similar in operation to cost indicating elements 16. As shown in FIG. 12 lowest order indicating element 108 rotates about shaft 110. A transfer tooth 112 on drum 108 drives pinion 114 once every revolution. Pinion 114 in turn drives gear 116 mounted coaxially with the indicating elements. Referring now to FIG. 13, gear 116 is connected to pawls 118 inside the next higher order indicating element 120. Indicating element 120 has a ratchet surface 122 which engages the pawls so that indicating element 120 moves one digit for every revolution of lowest indicating element 108. Correspondingly, when indicating element 120 moves a full revolution, transfer tooth 124 engages pinion 126 (shown in FIG. 3) to drive the next higher indicating element one digit. During the resetting of the indicating elements number shaft 110 is rotated in the same direction by gear train 90 (shown in FIGS. 15–16). Shaft 110 has a slot 128 which catches pawls 130 as shown in FIG. 14 secured to each indicating element and thereby rotates each element toward its zero condition.

During the dispensing operation clutches 66 and 68 are engaged to operate the printer indicating elements as a function of computer indicating elements as previously described. Printer motor 22 has not yet been turned on; thus rack 28 remains in the "out" position shown in FIG. 1. Timing shaft 46 whose functions will later be described in detail, is operated by motor 22 and is therefore stationary. As shown in FIG. 3 and hereinafter described timing shaft 46 operates full number mechanism 70 to rotate the lowest order printing elements to the nearest whole number immediately before the printing operation; and also operates printer reset mechanism 44 which includes clutch 50 and zeroizing mechanism 58. Since timing shaft 46 is stationary, full number mechanism 70 remains retracted and sliding reset clutch 50 remains disengaged from zeroizing mechanism 58 on the printer indicating elements.

When the dispensing operation is completed motor 22 is turned on and timing shaft 46 begins to rotate in the forward or print direction by its connection with motor 22 through gear train 48, shown in FIG. 3. When timing shaft 46 rotates in the forward or print direction (as rack 28 moves toward printing rollers 32 and 34) reset clutch 50 slidably mounted on timing shaft 46 moves pawls 52 to the non-effective position shown in FIG. 18. Pawls 52 are moved to the non-effective position when notch 54 engages the pawls as shown in FIGS. 5–6, to pivot the spring biased pawls about pins 56. Reset clutch 50 is thereby disengaged from the zeroizing mechanism 58, later described, which is connected to the printer indicating elements so that the printer indicating elements 16 and 18 are uninfluenced by the movement of timing shaft 46 and continue to show the cost and quantity of dispensed fluid until the direction of timing shaft 46 is reversed to the reset direction.

Also on timing shaft 46, as shown in FIG. 9, is a camming surface 60 which engages follower lug 62 on throwout bar or shifting yoke 64. Bar 64 is connected to disengageable clutches 66 and 68 and is arranged to engage slide clutches 66 and 68 with indicating elements 16 and 18 when follower 62 is on top of cam rise 61 as shown in FIG. 6; and to disengage the clutches when follower 62 is off of rise 61 as shown in FIG. 9. Each slide clutch includes mating serrated faces 67 and a gear 69 which engages a respective indicating element. When timing shaft moves in the print direction the printer indicating elements are disengaged from the computer as shown in FIG. 9 to enable full number mechanism 70 (shown in FIGS. 7–8 and of the type shown in U.S. Patent No. 2,127,243) to move the lowest order indicating elements to the nearest whole number. For example if the printer indicating elements 16 stop at $2.558 the full number mechanism 70 moves the lowest order indicating element to the next whole number so the value recorded is $2.56. Correspondingly, if indicating elements 16 stop at $2.552 the full number mechanism moves the lowest indicating number to $2.55. This assures a clear recording of the sales information since the indicating drums cannot stop in an intermediate position between two numbers. After clutches 66 and 68 have been disengaged, a cam 72 on timing shaft 46 releases projection 74, as shown in FIG. 8, when for example timing shaft 46 has rotated approximately one-half revolution in the forward or print direction. Spring 76 moves plate 78 so that pointers 80 and 82 contact star wheels 84 and 86 respectively. Star wheels 84 and 86 are coaxially mounted with indicating elements 16 and 18 respectively in such a manner the lowest order of indicating elements 16 and 18 are at a full number when pointers 80 and 82 are midway between adjacent projections or points on the star wheel as shown in FIG. 8. Consequently, when the indicating elements stop between full numbers, the pointers contact the sides of the tapered projections on star wheels 84 and 86 to rotate the star wheels until each pointer is midway between the projections thereby rotating the lowest order indicating elements to the nearest full numbers.

After timing shaft 46 rotates, for example ¾ of a revolution, the direction of motor 22 is reversed to also change the direction of timing shaft 46. During its reverse or reset direction, cam 72 on shaft 46 again contacts projection 74 on plate 78 to withdraw pointers 80 and 82 from star wheels 84 and 86 as shown in FIG. 7 so that indicating elements 16 and 18 are free to be reset. Reset clutch 50 also moves in the reverse direction shown in FIG. 17. After the full number mechanism has been retracted, camming surface notch 54 is adjacent pawls 52 to permit the pawls to return to the position shown in FIGS. 5 and 6 under the urging of spring 88. As clutch 50 continues to rotate, pawls 52 slide clutch 50 on shaft 46 toward zeroizing mechanism 58. Zeroizing mechanism 58 includes a gear train 90 with a pair of gears 92 and 94 (shown in FIGS. 15–16) which are coaxially mounted with indicating elements 16 and 18 respectively. The hub 96 of central gear 98 includes three equally spaced projections 100. Spring biased locking arm 102 engages one of the projections 100 as shown in FIG. 15 to hold the gear train in locked position during the print direction of timing shaft 46 when clutch 50 is uncoupled from zeroizing mechanism 58. Clutch 50 includes three equally spaced pins 104 which engage projections 100 when clutch 50 is moved toward gear 98 to the position shown in FIG. 17. As clutch 50 rotates one of the pins 104 contacts locking arm 102 and slides it out of engagement with projection 100. Pins 104 then engage projections 100 to rotate main gear 98 and thus transmit the rotation of timing shaft 46 to indicating elements 12 and 16 through gear train 90. Gear train 90 rotates shafts 110 to zeroize the indicating elements as previously described. Main gear 98 is connected to gears 92 and 94 through a three-to-one step-up so that 120° rotation of timing shaft 46 results in a full 360° rotation of gears 92 and 94 thus assuring the full zeroizing of elements 16 and 18.

After indicating elements 16 and 18 have been zeroized, slot 61 of cam 60 shown in FIG. 9 engages follower pin 62 to re-engage clutches 66 and 68 with indicating elements 16 and 18 for the next dispensing operation.

When the previous transaction is a cash sale, printing motor 22 is automatically actuated by computer reset switch S–6, as later described, to operate the ticket printer in the aforementioned manner although no invoice or credit card is inserted on rack 28.

FIG. 19 illustrates the interlocking circuit which prevents any fluid from being dispensed until printer indicating element 16 and 18 have been zeroized even if the printer were not used to record sales information. Assuming that the previous sale was a cash sale and the sales figures are still on the computer and the primer indicating elements, the following steps take place.

(1) In voice holding rack 28 is in the full "out" position shown in FIG. 1. Invoice rack "out" switch S–4 must be closed before cycle can start. This insures that rack is not over wheels.

(2) Rotation of the computer reset knob (not shown) resets the computer and momentarily closes S–6. This energizes relay K–2 which holds itself closed through a set of normally open contacts K–2–B; through switch S–2–B(F) which is at rest in the forward position; and through a set of normally closed contacts K–5–A.

(3) K–2–A contacts now close and start printing motor 22 running in forward, or printing, direction. The circuit is completed through S–2–A(F) forward contacts and normally closed contacts K–6–A.

(4) At the end of the printing, or forward direction, projections 40 shown in FIG. 1 trips the reversing switches (S–2–A and S–2–B) to the reverse, or resetting, direction. This causes printing motor 22 to run in the opposite direction through S–2–A(R). K–3 is also energized through S–2–B(R) and holds itself closed through a set of normally open contacts K–3–C and normally closed contacts K–5–A. Relay K–2 is also de-energized at this time because S–2–B(F) is now open.

(5) When relay K–3 energized in step 4 above, one set of normally open contacts K–3–B closed and prepared circuit for relay K–4. K–4 is a D.C. relay so it is necessary to have a rectifier and capacitor in the circuit. (This is also true for K–5.) The 18 ohm resistors are to limit the charging currents through the capacitors to protect the rectifiers.

(6) When rack 28 completes its reverse stroke, a projection on the rack (not shown) trips switches S–2–A and S–2–B to the forward position. This causes printing motor 22 to stop because, as noted in step 4 above, relay K–2 is de-energized and contacts K–2–A are open. Relay K–4 is also energized through S–2–B(F), K–3–B and K–5–A.

(7) When relay K–4 energizes, a set of contacts K–4–B energize relay K–5 which holds itself closed through contacts K–5–B and K–1–A.

(8) When relay K–5 energizes it opens normally closed contacts K–5–A. This de-energizes relays K–3 and K–4, however K–4 does not open for a time delay of approximately one second to insure that K–5 has completely closed. Contacts K–5–C close and energize relay K–6.

(9) When relay K–6 energizes, it opens contacts K–6–A which prevents printing motor 22 from running again until the dispenser has been turned on and off once.

(10) Turning on dispenser switch S–1 energizes relay K–1 which closes contacts K–1–B which completes holding circuit for relay K–6 through contacts K–6–B. Contacts K–1–A open which allows relay K–5 to de-energize after a time delay of about 1 second. Contacts K–1–C start pump 106 through contacts K–6–C.

(11) If the dispenser switch S–1 were turned on immediately after resetting the computer, pump 106 would not come on until relay K–6 energizes, which happens after the printer has completed its complete cycle. In this case, contacts K–1–A would be open when K–4–B contacts close. Thus, a time delay for K–5 opening is necessary to allow K–5–C contacts to remain closed long enough for K–6 to hold itself energized through K–6–B and K–1–B.

(12) At end of delivery, dispenser switch is opened and K–1 de-energizes. This opens K–1–B which de-energizes K–6. K–1–C also opens which stops pump motor. K–6–A is now closed—ready for another printing cycle.

(13) At the end of the delivery, the credit card and invoice are placed on rack 28. The manual actuating switch S–5 is closed which again starts the printing cycle. The explanation above can be repeated from step 2 to step 9, substituting S–5 for S–6. If S–5 is pushed in while dispenser is on, printing will be delayed until dispenser is turned off because contacts K–6–A will be open.

What is claimed is:

1. A ticket printer for a fluid dispenser having a computer with indicating elements for indicating the cost and quantity of the dispensed fluid and reset means for zeroizing said indicating elements before a subsequent dispensing operation comprising printer indicating elements connected to said computer indicating elements and operated thereby, a printing mechanism disposed adjacent said printer indicating elements for recording said cost and quantity of said dispensed fluid, printer reset means connected to said printer indicating elements for zeroizing said indicating elements before a subsequent dispensing operation, a reversible motor connected to said printing mechanism and to said printer reset means operating said printing mechanism in one direction of said reversible motor and operating said printer reset means in the other direction of said reversible motor whereby said printer indicating elements are automatically zeroized whenever said printing mechanism is used to record a transaction, and said reversible motor including means to reverse its direction and to prevent the start of another transaction before the zeroization.

2. A ticket printer as set forth in claim 1 wherein interlocking means connects said reversible motor with said computer reset means to actuate said motor when said computer reset means is actuated whereby said printer indicating elements are zeroized with said computer indicating elements to assure a zeroizing of said printer indicating elements before a subsequent dispensing operation.

3. A ticket printer as set forth in claim 2 wherein said interlocking means comprises switch means connected to said computer reset means and actuated thereby, and relay means in series with said reversible motor and with said switch means to operate said motor when said switch means is actuated by said computer reset means.

4. A ticket printer as set forth in claim 2 wherein a manually operable actuating member is connected to said reversible motor for manually actuating said motor after a credit sale.

5. A ticket printer as set forth in claim 1 wherein a timing shaft is connected to and driven by said reversible motor in a print direction and in a reset direction, said printer reset means being connected to said timing shaft and including coupling means on said timing shaft and zeroizing means on said printer indicating elements, said coupling means and said zeroizing means being disposed and arranged to engage each other when said timing shaft moves in said reset direction to zeroize said printer indicating elements.

6. A ticket printer as set forth in claim 5 wherein said coupling means comprises a clutch mounted on said timing shaft and axially movable thereon, pawl means disposed adjacent said clutch, a camming surface on said clutch disposed and arranged to move said pawl means to a noneffective position when said timing shaft moves in said print direction and to engage said pawl means when said timing shaft moves in said reset direction whereby said pawl means axially moves said clutch toward said zeroizing means, and complementary engaging means on said clutch and on said zeroizing means to couple said clutch and said zeroizing means when said timing shaft moves in said reset direction.

7. A ticket printer as set forth in claim 6 wherein said zeroizing means includes a gear train connected to said printer indicating elements, locking means connected to said gear train to hold said gear train stationary when said timing shaft moves in said print direction, and said complementary engaging means being disposed and arranged to release said locking means from said gear train when said timing shaft moves in said reset direction whereby the movement of said clutch is transmitted to said gear train to zeroize said printer indicating elements.

8. A ticket printer as set forth in claim 7 wherein said gear train includes a main gear mounted coaxial with said clutch, said complimentary engaging means including spaced projections on said main gear, and spaced pins on said clutch disposed and arranged to contact said projections when said clutch is moved axially toward said main gear.

9. A ticket printer as set forth in claim 5 wherein said computer includes a cost shaft and a quantity shaft, transmission means disengageably connecting said cost shaft and said quantity shaft to said printer indicating elements, said transmission means including clutch means engaging the lowest order of said printer indicating elements, and camming means on said timing shaft disposed and arranged to disengage said clutch means from said lowest order indicating elements when said timing shaft moves in said print direction and to reengage said clutch means when said timing shaft moves in said reset direction.

10. A ticket printer as set forth in claim 5 wherein a whole number mechanism is disposed adjacent the lowest order of said printer indicating elements to move said lowest order indicating elements to the nearest full number, and camming means on said timing shaft being disposed and arranged to move said whole number mechanism into engagement with said lowest order indicating elements when said timing shaft moves in said print directon and to move said whole number mechanism out of engagement with said lowest order indicating elements when said timing shaft moves in said reset direction.

11. A ticket printer as set forth in claim 10 wherein said computer includes a cost shaft and a quantity shaft, transmission means disengageably connecting said cost shaft and said quantity shaft to said printer indicating elements, said transmission means including clutch means engaging said lowest order printer indicating elements, clutch camming means on said timing shaft disposed and arranged to disengage said clutch means from said lowest order indicating elements when said timing shaft moves in said print direction and to reengage said clutch means when said timing shaft moves in said reset direction, said clutch camming means being disposed and arranged to disengage said clutch means before said whole number camming means actuates said whole number mechanism when said timing shaft moves in said print direction and being disposed and arranged to reengage said clutch means after said whole number camming means disengages said whole number mechanism when said timing shaft moves in said reset direction.

12. A ticket printer as set forth in claim 11 wherein said transmission means includes a ten-to-one gearing mechanism connecting said computer indicating elements to said printer indicating elements whereby said printer indicating elements indicates one digit more than said computer indicating elements.

No references cited.

DARYL W. COOK, *Primary Examiner.*

U.S. Cl. X.R.

222—30